United States Patent
Zhang et al.

(10) Patent No.: US 11,028,987 B2
(45) Date of Patent: Jun. 8, 2021

(54) DOUBLE-ROW MATRIX ILLUMINATION MODULE AND AUXILIARY ILLUMINATION METHOD THEREOF

(71) Applicant: HASCO Vision Technology Co., LTD, Shanghai (CN)

(72) Inventors: Dapan Zhang, Shanghai (CN); Xiaofen Sun, Shanghai (CN); Zhiping Qiu, Shanghai (CN)

(73) Assignee: HASCO Vision Technology Co., LTD, Shanghai (CN)

(*) Notice: Subject to any disclaimer, the term of this patent is extended or adjusted under 35 U.S.C. 154(b) by 0 days.

(21) Appl. No.: 16/654,700

(22) Filed: Oct. 16, 2019

(65) Prior Publication Data

US 2020/0132268 A1    Apr. 30, 2020

Related U.S. Application Data

(63) Continuation of application No. PCT/CN2019/078789, filed on Mar. 19, 2019.

(30) Foreign Application Priority Data

Oct. 25, 2018   (CN) .......................... 201811248104.9

(51) Int. Cl.
   *B60Q 1/00*     (2006.01)
   *F21S 41/153*   (2018.01)
   *B60Q 1/14*     (2006.01)

(52) U.S. Cl.
   CPC .......... *F21S 41/153* (2018.01); *B60Q 1/1415* (2013.01)

(58) Field of Classification Search
   CPC ........ F21S 41/29; F21S 41/153; F21S 41/151; F21S 45/47; F21S 41/192; F21S 41/39;
   (Continued)

(56) References Cited

U.S. PATENT DOCUMENTS 9,720,158 B2 *  8/2017  Peana ................... G02B 6/002
10,480,742 B2 * 11/2019 Joerg ................... F21S 41/143
(Continued)

FOREIGN PATENT DOCUMENTS

CN    104373895 A    2/2015
CN    105299562 A    2/2016
(Continued)

OTHER PUBLICATIONS

International Search Report and Written Opinion of corresponding application PCT/CN2019/078789, dated Aug. 2, 2019, with English translation.

*Primary Examiner* — William J Carter
*Assistant Examiner* — Omar Rojas Cadima
(74) *Attorney, Agent, or Firm* — Leason Ellis LLP

(57) ABSTRACT

The invention relates to a double-row matrix illumination module, wherein a light source part comprises an LED circuit board and a heat sink that are secured to each other; a primary optical system comprises a primary optical element mounting bracket, a primary optical element press plate and an LED circuit board. Primary optical elements are all mounted on the primary optical element mounting bracket in position. The primary optical elements are consisted of two layers, wherein the upper layer is primary optical element A and the lower layer is primary optical element B. The primary optical element mounting bracket configured as a base component for mounting and positioning comprises two rows of rectangular holes for fixing light-incident ends of the primary optical element A and the primary optical element B respectively and separating the light-incident ends from each other. The invention can realize anti-dazzling high beam function, low beam follow-up steering function, high beam follow-up steering; regarded as a whole, the follow-up steering function can be realized for the high beam and the low beam, thereby improving (Continued)

illumination experience when steering. Structurally, the invention is simple and compact, accurate in positioning, convenient for disassembly and assembly, easy to guarantee the actual product quality.

10 Claims, 4 Drawing Sheets

(58) Field of Classification Search
CPC ..... F21S 41/635; F21S 43/51; F21Y 2105/10; F21Y 2103/10; F21Y 2105/16; F21V 17/12
See application file for complete search history.

(56) References Cited

U.S. PATENT DOCUMENTS

| | | | |
|---|---|---|---|
| 2004/0263346 A1* | 12/2004 | Neal | F21S 41/143 340/815.45 |
| 2008/0198574 A1 | 8/2008 | Woodward et al. | |
| 2008/0253144 A1* | 10/2008 | Dolson | B60Q 1/0041 362/547 |
| 2011/0141754 A1* | 6/2011 | Hikmet | F21S 41/16 362/464 |
| 2015/0276198 A1* | 10/2015 | Hata | F21V 29/70 362/382 |

FOREIGN PATENT DOCUMENTS

| CN | 108397743 A | 8/2018 |
|---|---|---|
| CN | 108397746 A | 8/2018 |
| CN | 109268774 A | 1/2019 |

\* cited by examiner

DOUBLE-ROW MATRIX ILLUMINATION MODULE AND AUXILIARY ILLUMINATION METHOD THEREOF

BACKGROUND OF THE INVENTION

Technical Field

The invention relates to an illumination module, in particular to a double-row matrix illumination module and an auxiliary illumination method thereof.

Description of Related Art

As an updating product in automotive lighting technology, a matrix headlight attracts wide consumer. The matrix headlight adopting combination and arrangement of various light sources collects various driving status through an in-vehicle radar and sensor, then controls sub-light sources by an intelligent system, so that the light pattern can automatically adapt to the driving environment. At this time, the matrix headlight is not only an individual automotive part but also a terminal member in close fit with a ADAS system.

The existing matrix illumination modules cannot independently realize auxiliary light pattern design for low beam, high beam, left-bending and right-bending. In addition, the existing matrix illumination modules are more complicated in mounting structure, imprecise in parts positioning, very difficult in positioning, inconvenient in disassembly and assembly and not conducive to ensuring the quality of the product.

BRIEF SUMMARY OF THE INVENTION

The objective of the present invention is to provide a double-row matrix illumination module and an auxiliary illumination method thereof. The double-row matrix illumination module can realize conventional high beam, anti-dazzling high beam function, low beam follow-up steering function and high beam follow-up steering function. High beam comprises a plurality of LED sources that can be turned on or off separately to illuminate different areas, thereby realizing anti-dazzling high beam function. Regarded as a whole, the follow-up steering function can be realized for the high beam and the low beam, thereby improving illumination experience when steering. Structurally, the invention is simple and compact, accurate in positioning, convenient for disassembly and assembly, easy to guarantee the actual product quality.

The following technical solution is adopted by the invention.

A double-row matrix illumination module comprising the light source part, primary optical system and secondary projection system. The light source part includes an LED circuit board and a heat sink that are secured to each other; and the primary optical system includes a primary optical element mounting bracket, a primary optical element press plate and an LED circuit board. Primary optical elements are all mounted on the primary optical element mounting bracket in position; the primary optical elements are consisted of an upper layer that is a primary optical element A and a lower layer that is a primary optical element B. The primary optical element A and the primary optical element B are provided with a row of independent light-incident ends, each of which corresponds to an LED; the secondary projection system includes a lens and a lens holder that are connected by a lens collar; the lens holder 3 is fixedly connected to the optical element mounting bracket; the primary optical element mounting bracket configured as a base component for mounting and positioning comprises two rows of rectangular holes for fixing light-incident ends of the primary optical element A and the primary optical element B respectively and separating the light-incident ends from each other.

Further, spacing ribs are arranged between the rectangular holes, and the front end surfaces of the spacing ribs are used as optical axis direction positioning surfaces of the primary optical elements to abut against the light-incident end connecting ribs, thereby preventing the primary optical elements from moving towards the LEDs; the primary optical element mounting bracket is provided with a horizontally extending platform for supporting the primary optical elements thereon and preventing the primary optical elements from moving away from the optical axis.

Further, the primary optical element press plate is in fit with the primary optical element mounting bracket to tightly clamp the primary optical elements in the middle; the primary optical element press plate and the primary optical element mounting bracket have light blocking effect.

Further, the primary optical element press plate is made of plastic material and provided with a snap structure and a first positioning pin structure on both sides.

Further, the primary optical element press plate is provided with a groove in fit with the upper edge flanges of the primary optical elements.

Further, the primary optical element mounting bracket is provided with a second positioning pin structure, and the primary optical element press plate 5 and the heat sink are provided with the corresponding positioning holes.

Further, the positioning holes on the primary optical element press plate are arranged near the both sides of the LEDs; During installation, the positioning pins are sequentially inserted into the primary optical element press plate and the heat sink, and then fastened by screws on the back of the heat sink.

Further, the lens holder is provided with four thread studs secured to the primary optical element mounting bracket; the heat sink is also provided with through holes at the four thread studs; outside the lens holder, there are three dimming dot structures that enable the double-row matrix illumination module mounted in the lamp to adjust light vertically and horizontally.

Further, the lens collar is a PC element with four clips that are connected with the lens holder (3) by way of clamping for fixing the lens.

An auxiliary illumination method of the double-row matrix illumination module comprises the following auxiliary illumination modes: A) anti-dazzling high beam auxiliary mode: the LEDs halfway between the primary optical element A (6) and the primary optical element B (7) are closed, the LEDs in the middle of left halves of the primary optical element A (6) and the primary optical element B (7) are closed and the remaining LEDs are opened; B) low beam auxiliary mode: the LEDs of the primary optical element (7) on the right half are opened and the remaining LEDs are closed; C) low beam left-bending auxiliary mode: the LEDs of the primary optical element (7) on the right half are opened, the LED in the middle are opened, the LEDs on the right side of the left half are opened and the remaining LEDs are closed; D) low beam right-bending auxiliary mode: the LEDs on the right side of the primary optical element (7) on the right half are opened and the remaining LEDs are closed.

The invention has the following beneficial effects:

1) The invention can realize conventional high beam, anti-dazzling high beam function, low beam follow-up steering function, and high beam follow-up steering function.

2) The high beam adopts a plurality of LED sources that can be turned on or off separately to illuminate different areas, thereby achieving anti-dazzling high beam function.

3) Regarded as a whole, the follow-up steering function can be realized for the high beam and the low beam, thereby improving illumination experience when steering.

4) Structurally, the invention is simple and compact, accurate in positioning, convenient for disassembly and assembly, and easy to guarantee the actual product quality.

Figure 1:
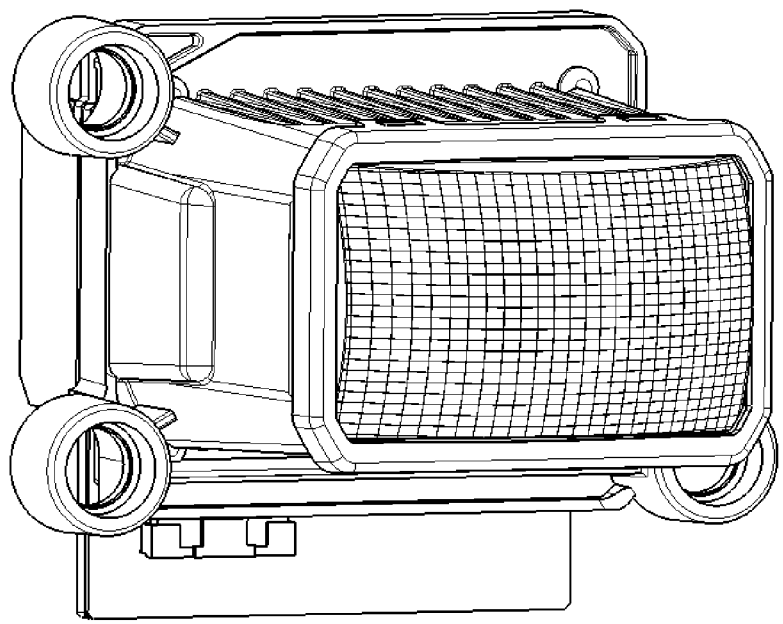
FIG. 1 is a perspective view of the double-row matrix illumination module in the present invention.
Figure 2:
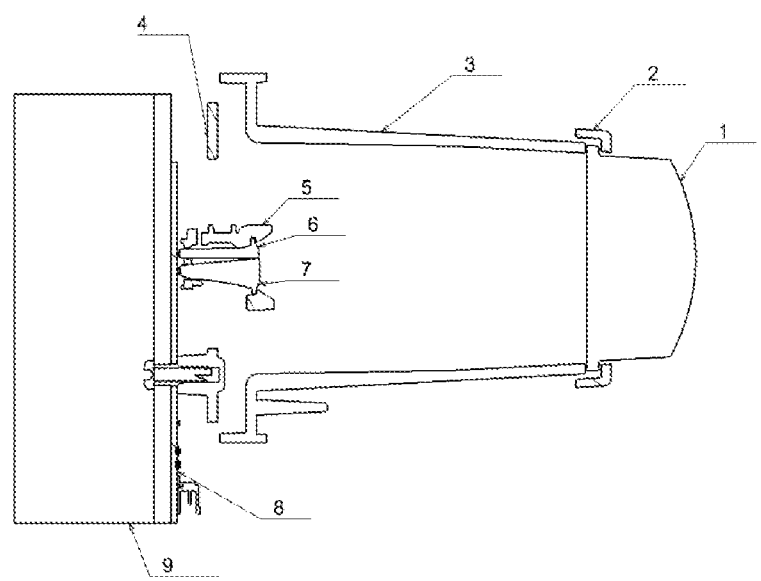
FIG. 2 is a cross-sectional view of the double-row matrix illumination module of the present invention from a left side perspective.
Figure 3:
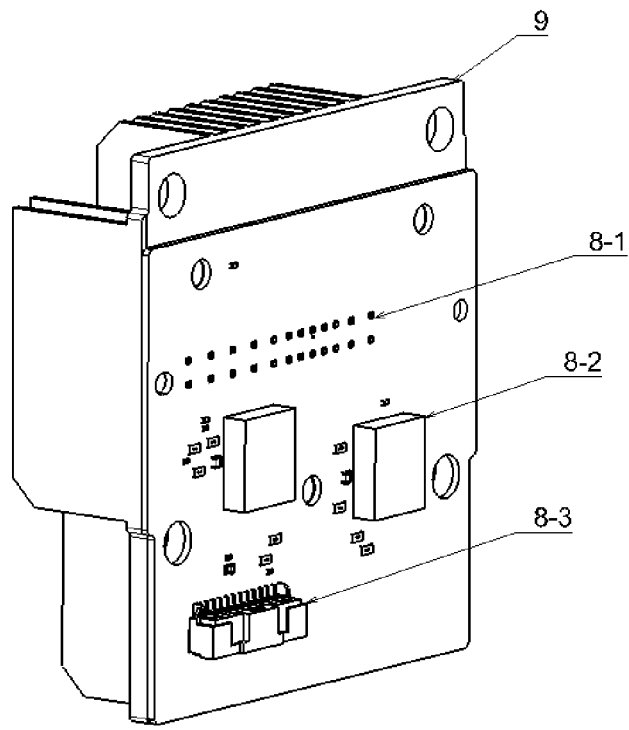
FIG. 3 is a schematic diagram of the circuit board and the heat sink.
Figure 4:
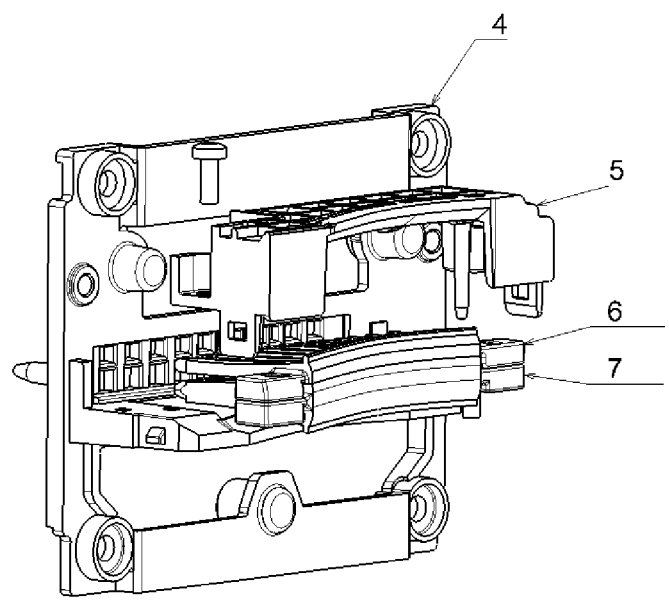
FIG. 4 is a schematic diagram of the primary optical system.
Figure 5:
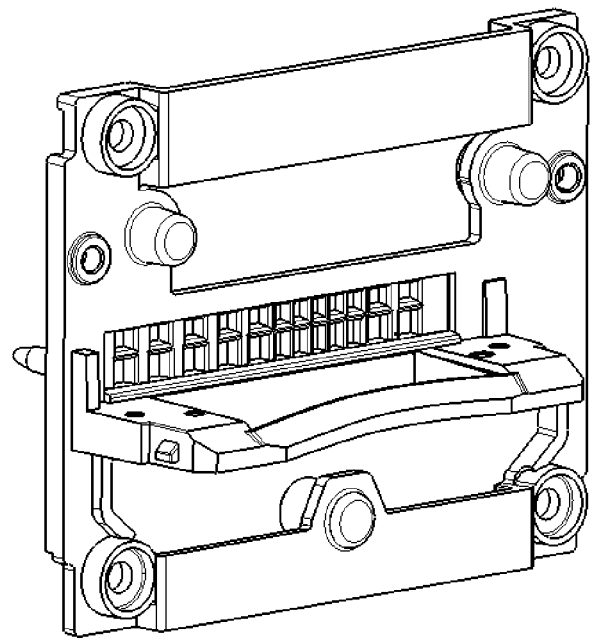
FIG. 5 is a schematic diagram of the primary optical system mounting bracket.
Figure 6:
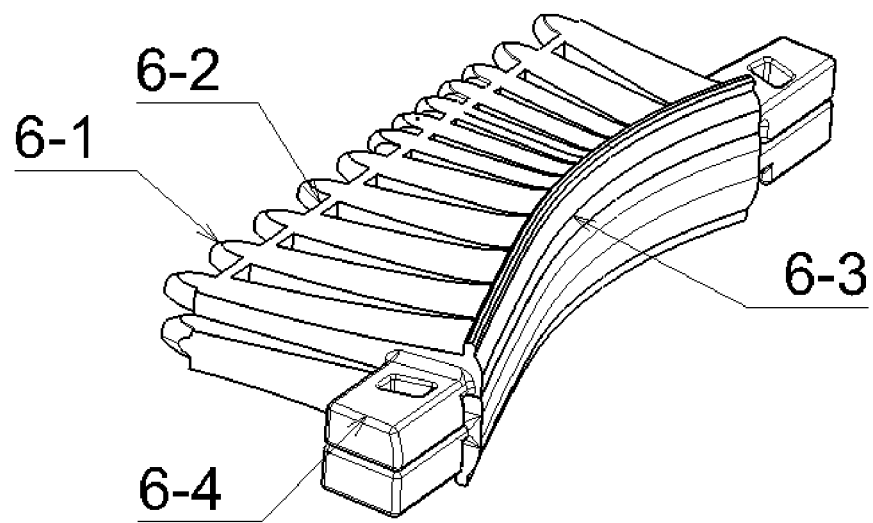
FIG. 6 is a schematic diagram of the primary optical element.
Figure 7:
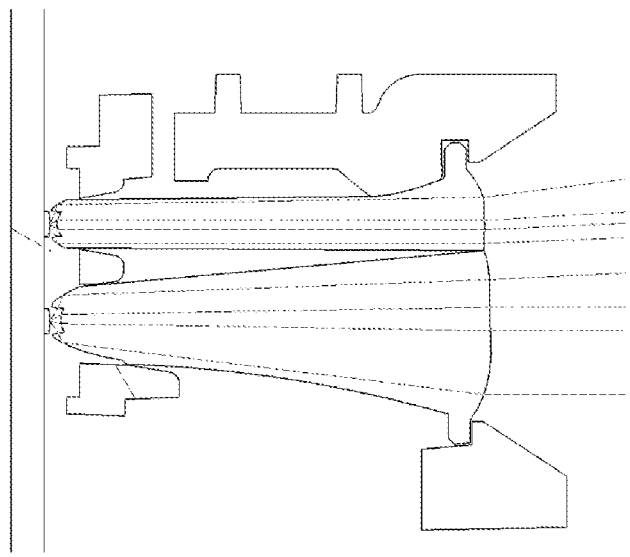
FIG. 7 is a schematic diagram of the optical path of the primary optical element.

In the FIG. 1. lens; 2. lens collar; 3. lens holder; 4. primary optic element mounting bracket; 5. primary optical element press plate; 6. primary optical element A; 7. primary optical element B; 8. LED circuit board; 9. heat sink; 6-1. light-incident ends; 6-2. light-incident end connecting ribs; 6-3. light-exiting surfaces; 6-4. mounting supports; 8-1. LED mounting position; 8-2. control circuit module; 8-3. connector assembly

DETAILED DESCRIPTION OF THE INVENTION

The present invention is further illustrated by the following drawings in combination with the embodiments.

Referring to FIGS. 1-6, a double-row matrix illumination module comprises a light source part, a primary optical system and a secondary projection system; the light source part includes an LED circuit board 8 and a heat sink 9 that are secured to each other.

In the light source part, the LED circuit board is provided with dozens of LEDs in two rows; the LEDs are single-chip white light sources; the circuit board is a copper substrate and has good heat dissipation; the LED board comprises a control circuit module 8-2 for controlling turn-on or turn-off of LED chips and a connector assembly; the LEDs on the entire circuit board can be individually turned on or off and adjusted brightness; the heat sink is preferably made of aluminum profile, and has good heat dissipation effect, low processing cost and only need for cutting and drilling the aluminum profile.

The primary optical system includes a primary optical element mounting bracket 4, a primary optical element press plate 5 and an LED circuit board 8. Primary optical elements are all mounted on the primary optical element mounting bracket 4 in position; the primary optical elements are consisted of an upper layer that is a primary optical element A 6 and a lower layer that is a primary optical element B 7; the primary optical element A 6 and the primary optical element B 7 are provided with a row of independent light-incident ends respectively, and each light-incident end corresponds to an LED.

In the primary optical system, the primary optical elements are core components. Silica gel is recommended to be used for preparing such components, and has advantages of high temperature resistance, good permeability, good replicability and capacity to realize complex structural design The primary optical element is composed of a plurality of collimating condensers, including light-incident ends 6-1, light-incident end connecting ribs 6-2, light-exiting surfaces 6-3 and mounting supports 6-4; The plurality of light-incident ends correspond to different LED sources respectively; the single collimator is rod-shaped and the light-incident ends are condensing bowl-shaped with concave-shaped middle part; multiple collimators line up in a row, and between two adjacent collimating units, the light-incident ends 6-1 are connected by connecting ribs 6-2; the light-incident ends 6-1 have focuses on the same plane; the light-exiting surfaces are connected with each other to form a continuous light-exiting surface 6-3. The mounting supports are of installation structure and are arranged on the both sides of the primary optical element and near the light-exiting surface; the optical axis direction of the middle collimator is the same as the system optical axis, and the adjacent collimators are at a certain rotation angle from the middle system optical axis. The closer to the outside, the larger the rotation angle is. The width of the single condenser in the middle is narrow, and the width of the condenser on both sides is wide. After being projected by the lens and then irradiating on a 25-$m$ screen, the light spots in the middle are narrow and the light spots on both sides are wide. The main purpose is to achieve higher accuracy of pixel in the middle part while meeting fixed irradiation angle.

In this case, there are two primary optical elements which are in upper and lower arrangement, and the middle light-exiting surface closely rests against them to prevent generation of gap between the upper and lower light-exiting surfaces, resulting in dark lines on the projection screen. The primary optical elements arranged in two rows have more functions than that arranged in one row. The primary optical elements in a row can only realize anti-dazzling high beam function. By arranging one row of light patterns above a stop line and another row of light patterns below the stop line, part of light spots light up as a supplement for intensity of low beam light when the low beam is opened; or the light spots are sequentially turned on or off from left to right with angle of steering wheel to form the effect of inflection-point movement on road and achieve effect like AFS with motor as a supplementary lighting for bending light when rotation of steering wheel.

The primary optical element mounting bracket is made of metal and used as base component for mounting and positioning. The primary optical element mounting bracket is provided two rows of rectangular holes for fixing light-incident ends of softer condensers respectively and ensuring relative position of each light-incident end accurate. In addition, the light-incident ends can be separated from each other to ensure non-interaction among different sub-units. The distance from the primary optic elements to the LEDs is critical, which affects the efficacy and safety of the optical system. The front end surfaces of the spacing ribs between the rectangular holes are used as optical axis direction positioning surfaces of the primary optical elements to abut against the 6-2, thereby preventing the primary optical elements from moving towards the LEDs; the primary optical element mounting bracket 4 is provided with a horizontally extending platform that has two functions: one is to support the primary optical elements thereon and the other is to prevent the primary optical elements from moving away from the optical axis.

The primary optical element press plate is in fit with the primary optical element mounting bracket to tightly clamp the primary optical elements in the middle. The primary optical element press plate and the primary optical element mounting bracket have both mounting effect and light blocking effect. Mountable structures are covered and only light-exiting surfaces of the primary optical elements are left to transmit light.

It is preferable that the press plate is made of plastic material and provided with a snap structure and a positioning pin structure on both sides. The positioning pin and the metal mounting bracket are positioned to ensure the installation accuracy. On the pressing plate, there is a groove in fit with the upper edge flanges of the primary optical elements, ensuring anterior-posterior position of the light-exiting surface of the primary optical element 6 on the one hand and tightly pressing the primary optical element 6 so that the primary optical element 6 abuts against the primary optical element 7 tightly, preventing generation of gap on the other hand. Because the press plate is a plastic part, it is provided with reinforced ribs in design to ensure its own strength.

There are also positioning pins at the back of the mounting bracket and on the circuit board and the heat sink, there are positioning holes corresponding to the positioning pins. The positioning holes on the circuit board are arranged near the both sides of the LEDs to ensure the effectiveness of positioning well. During installation, the positioning pins are inserted into the circuit board from the back side, and then into the heat sink from the back side, afterwards fastened by screws from back of the heat sink. Such structure has advantage of convenient disassembly and assembly of circuit board. On the circuit board, there are dozens of LED sources. If some light sources are damaged, the heat sink and the circuit board can be easily disassembled and changed.

The said secondary projection system includes a lens 1 and a lens holder 3 that are connected by a lens collar 2; the lens holder 3 is secured to the optical element mounting bracket 4; and the primary optical element mounting bracket 4 configured as a base component for mounting and positioning comprises two rows of rectangular holes for fixing the light-incident ends of the primary optical element A 6 and the primary optical element B 7 respectively and separating the light-incident ends from each other.

The core of the secondary projection system is lens. The lens 1 is arranged on the front end of the light-exiting surface and the light-exiting surface of the condenser is on the focal plane of the lens. The lens is the combination of a single convex lens or multiple lenses. In the case of a single lens, the lens form includes plano-convex lens, biconvex lens, and meniscus convex lens; the combination of multiple lens is to combine convex lens with concave lens, conductive to eliminate chromatic aberration and defective aberration.

The surface of the lens is of reticular structure, which has two functions: connecting light patterns uniformly and weakening chromatic dispersion.

The mesh has a diffusion function, aimed to increase the overlap between the pixels, so that the integral connection between the pixels is uniform.

The mesh diffuses the light patterns, obfuscates boundary and weakens chromatic dispersion at boundary too.

The lens holder has a function of connecting the primary optical elements with secondary optical elements. The front end surface is closely attached to the lens, and the back end surface is connected to the primary optical element mounting bracket. During mounting, the lens holder has four thread studs secured to the mounting bracket to ensure stability and reliability of installation. In addition, on the heat sink, there are also through holes at the four thread studs. Such through holes have advantages as follows: the lens holder can be changed only by using a screw driver to unscrew screws on the lens holder through the through holes without disassembling the heat sink and the circuit board and changing the relative position of the primary optical system. Outside the lens holder, there are three dimming dot structures that enable the module mounted in the lamp to adjust light vertically and horizontally.

The lens collar is a PC element with four clips that are connected with the lens holder by way of clamping for fixing the lens. Such clip design also facilitates the disassembly and assembly of the lens. If the lens needs to be replaced, the lens can be disassembled by slightly moving the clips. The lens collar is preferably made of opaque material that encloses the lens in one circle, thereby covering the positioning structure or flange structure of the lens and leaving only the optical surface that requires light transmission.

Figure 8:
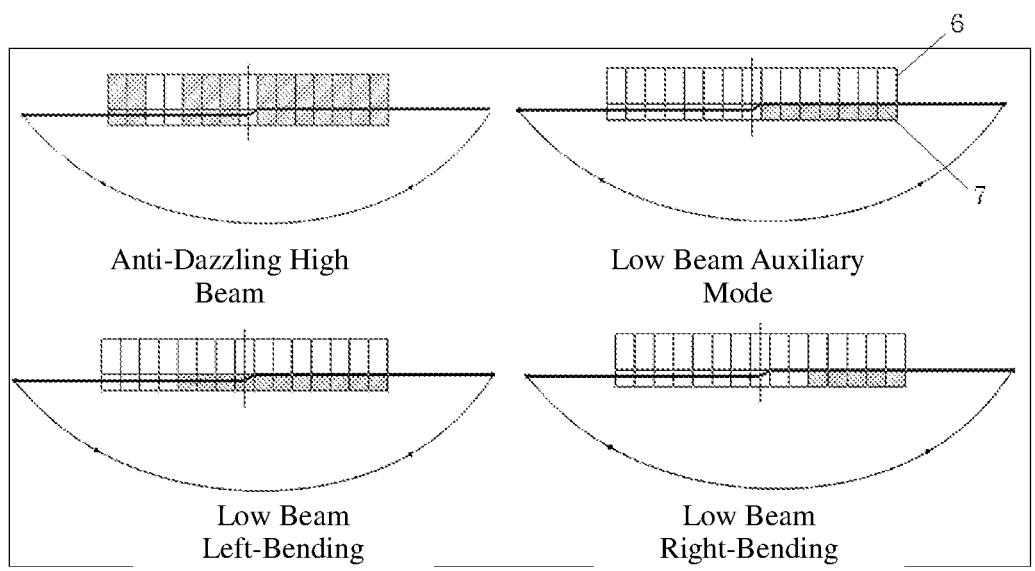
FIG. 8 is a schematic diagram of four auxiliary illumination modes in the auxiliary illumination method of the double-row matrix illumination module.

The double-row matrix illumination module comprises the following auxiliary illumination modes as shown in FIG. 8 during auxiliary illumination: A) anti-dazzling high beam auxiliary mode: the LEDs halfway between the primary optical element A 6 and the primary optical element B 7 are closed, the LEDs in the middle of left halves of the primary optical element A 6 and the primary optical element B 7 are closed and the remaining LEDs are opened; B) low beam auxiliary mode: the LEDs of the primary optical element B 7 on the right half are opened and the remaining LEDs are closed; C) low beam left-bending auxiliary mode: the LEDs of the primary optical element B 7 on the right half are opened, the LED in the middle are opened, the LEDs on the right side of the left half are opened and the remaining LEDs are closed; D) low beam right-bending auxiliary mode: the LEDs on the right side of the primary optical element B 7 on the right half are opened and the remaining LEDs are closed.

The above are the preferred embodiments of the present invention, and ordinary skill in the art can make various changes or improvements on the basis of the present invention. These changes or improvements should belong to the scope of protection claimed in the present invention as long as no deviation from general concept of the present invention.

What is claimed is:

1. A double-row matrix illumination module, comprising:
a light source, a primary optical system, and a secondary projection system;
wherein the light source includes an LED circuit board and a heat sink that are secured to each other;
wherein the primary optical system includes primary optical elements, a primary optical element mounting bracket, a primary optical element press plate, and an LED circuit board; wherein the primary optical elements are mounted on the primary optical element mounting bracket; wherein the primary optical elements comprise primary optical element A and primary optical element B; wherein the primary optical element A and the primary optical element B each comprise a row of light-incident ends, wherein each light-incident end corresponds to an LED;

wherein the secondary projection system includes a lens and a lens holder that are connected to each other by a lens collar; and the lens holder is fixedly connected to the optical element mounting bracket;

wherein the primary optical element mounting bracket comprises two rows of holes for receiving the light-incident ends of the primary optical element A and the primary optical element B, wherein the lens holder is provided with at least one thread stud secured to the primary optical element mounting bracket; wherein the heat sink is provided with at least one through hole at the at least one thread stud; wherein the double-row matrix illumination module further comprises at least one dimming dot structure that enables the double-row matrix illumination module to adjust light vertically and horizontally.

2. The double-row matrix illumination module according to claim 1, wherein spacing ribs are arranged between the holes, and the front end surfaces of the spacing ribs are used as optical axis direction positioning surfaces of the primary optical elements to abut against light-incident end connecting ribs, thereby preventing the primary optical elements from moving towards the LEDs; the primary optical element mounting bracket is provided with a horizontally extending platform for supporting the primary optical elements thereon and preventing the primary optical elements from moving away from the optical axis.

3. The double-row matrix illumination module according to claim 1, wherein the primary optical element press plate is configured to fit with the primary optical element mounting bracket so as to tightly clamp the primary optical elements; the primary optical element press plate and the primary optical element mounting bracket have light blocking effect.

4. The double-row matrix illumination module according to claim 1, wherein the primary optical element press plate is provided with a snap structure and a first positioning pin on both sides.

5. The double-row matrix illumination module according to claim 1, wherein the primary optical element press plate is provided with a groove configured to fit with an upper edge flange of the primary optical elements.

6. The double-row matrix illumination module according to claim 1, wherein the primary optical element mounting bracket is provided with a positioning pin, and the primary optical element press plate and the heat sink are provided with corresponding positioning holes.

7. The double-row matrix illumination module according to claim 6, wherein the positioning holes on the primary optical element press plate are arranged near both sides of the LEDs.

8. The double-row matrix illumination module according to claim 1, wherein the lens holder is provided with four thread studs; wherein the heat sink is provided with through holes at the four thread studs; and wherein the double-row matrix illumination module comprises three dimming dot structures.

9. The double-row matrix illumination module according to claim 8, wherein the lens collar is a PC element with four clips that are connected with the lens holder by way of clamping for fixing the lens.

10. An auxiliary illumination system comprising the double-row matrix illumination module according to claim 1, the system having the following auxiliary illumination modes:
   A) Anti-dazzling high beam auxiliary mode: the LEDs halfway between the primary optical element A and the primary optical element B are turned off, the LEDs in the middle of left halves of the primary optical element A and the primary optical element B are turned off, and the remaining LEDs are turned on;
   B) Low beam auxiliary mode: the LEDs of the primary optical element on the right half are turned on and the remaining LEDs are turned off;
   C) Low beam left-bending auxiliary mode: the LEDs of the primary optical element on the right half are turned on, the LED in the middle are turned on, the LEDs on the right side of the left half are turned on, and the remaining LEDs are turned off;
   D) Low beam right-bending auxiliary mode: the LEDs on the right side of the primary optical element on the right half are turned on and the remaining LEDs are turned off.

* * * * *